A. G. MILLER.
COFFEE AND TEA URN.
APPLICATION FILED JAN. 29, 1907.
918,765.
Patented Apr. 20, 1909.
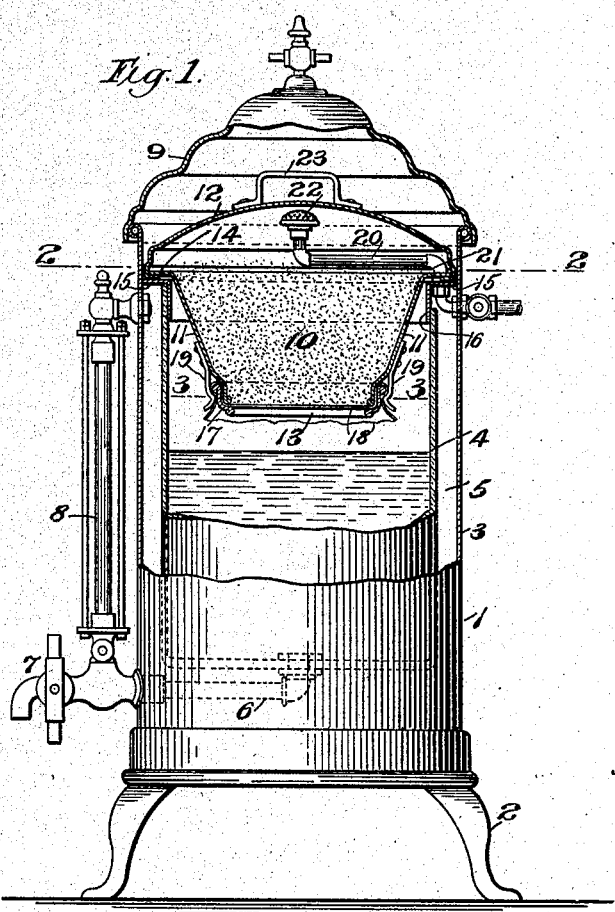
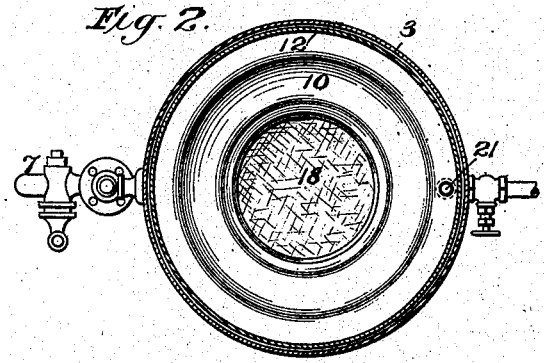
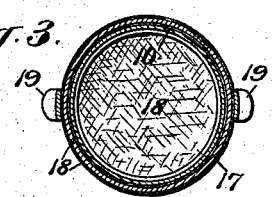
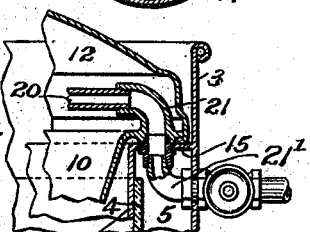
Inventor:
Archibald G. Miller
by his Attys:
Philipp Sawyer Rice & Kennedy

UNITED STATES PATENT OFFICE.

ARCHIBALD G. MILLER, OF JERSEY CITY, NEW JERSEY.

COFFEE AND TEA URN.

No. 918,765.  Specification of Letters Patent.  Patented April 20, 1909.

Application filed January 29, 1907. Serial No. 354,599.

*To all whom it may concern:*

Be it known that I, ARCHIBALD G. MILLER, a citizen of the United States, residing at Jersey City, county of Hudson, and State of New Jersey, have invented certain new and useful Improvements in Coffee and Tea Urns, fully described and represented in the following specification and the accompanying drawings, forming a part of the same.

This invention relates to improvements in coffee and tea urns and the like, and particularly to that class of coffee and tea urns used in hotels, restaurants and like places where coffee is made in large quantities. In the constructions heretofore used in making coffee, tea, etc. in urns of this class, a bag of some textile material has been employed for holding the coffee and tea during the steeping process. In these prior constructions making use of this bag it was necessary to handle the steeped coffee several times before it became strong enough for consumption, because the water when added would pass through the interstices of the material before the coffee or tea was steeped to a sufficient strength. The use of this bag, in addition to this disadvantage, is undesirable because it could be used but two or three times, and if used more than such number of times the coffee made therewith would be undrinkable. Furthermore, in changing the bags (it being impossible to sufficiently clean the bag) coffee dripped therefrom and rendered the use of the bag uncleanly.

It is one object of the present invention to produce a construction for making coffee, tea, etc. in large quantities without the use of these bags, and which construction, furthermore, shall render more than one handling of the coffee unnecessary.

It is a further object of the invention to produce a construction for holding the coffee, tea and the like, while it is being steeped, which is readily removable from the urn and which is of such a character that it may be readily cleaned and used an indefinite number of times.

With these and other objects in view the invention will now be described in detail, in connection with the accompanying drawing, in which,—

Figure 1 is an elevation of the improved coffee urn, partly in section. Fig. 2 is a cross section, taken on line 2—2 of Fig. 1. Fig. 3 is another cross section, taken on line 3—3 of Fig. 1. Fig. 4 is a detail sectional view on an enlarged scale, showing the pipe connections for supplying water to the container.

Referring now to the accompanying drawing, which illustrates a preferred embodiment of the invention, 1 indicates generally a coffee urn of the type generally used in hotels and restaurants. This urn is supported in any suitable manner, as on legs 2. The urn proper is of the ordinary construction, comprising an outer jacket 3, this outer jacket being of any suitable material and suitable configuration. With the outer jacket 3 there is positioned, as is usual, a liquid holding receptacle 4. This liquid holding receptacle 4 is supported within the jacket 3 and is spaced therefrom to form a chamber 5, this chamber 5 being adapted to contain hot water for the purpose of keeping the coffee hot, the water for this purpose being supplied in any suitable manner. This liquid holding receptacle 4 may be of any suitable material, but preferably is of crockery or enameled ware. This receptacle 4 may be supported in any suitable manner within the jacket 1. As shown, it is supported by the delivery pipe 6 (shown in dotted lines,) which delivery pipe extends out through the jacket 3 and is provided at its outer extremity with a draw off faucet 7. As is usual in the construction of these urns, there is provided a gage 8, this gage being connected at its lower extremity with the delivery pipe 6 and supported thereby, and is held securely at its upper end to the jacket 3 by a bolt. The urn is covered by an ordinary loose fitting cover 9, this cover being lifted back and forth when occasion requires.

The construction by which the bag of textile material heretofore used for containing the coffee or tea is to be steeped is dispensed with may be somewhat varied. This construction will, however, include a removable containing receptacle for holding the coffee and tea, which receptacle will, for a purpose hereinafter referred to, be made of some water-tight material, and such a receptacle will now be described in detail. The construction of this receptacle may be varied, but in the particular construction shown this container, which is marked 10 in the drawing, is a cylindrical receptacle, though other shapes may be used if desired, and is provided with side walls 11 and top 12 of a water-tight material and has an outlet 13, which outlet in the construction shown is formed at the bottom of the receptacle. This receptacle 10 is positioned in the urn so that its outlet shall be in communication with the liquid holding receptacle 4, so as to deliver thereto. This receptacle 10 is of any suitable water-tight material, but preferably it is made of aluminum both for cheapness in manufacture and for ease and thoroughness in cleaning. The side walls 11 of this receptacle in the construction shown converge or come together at the lower or delivery end of the container, thus forming a restricted outlet which serves to retard the passage of water through the container, thereby holding the water in contact with the coffee until it has become sufficiently steeped. This construction embodying a restricted outlet, while desirable because of its greater efficiency, is not essential, as other cylindrical forms having walls and top made of some water-tight material will hold the water a sufficient time to permit the coffee to be steeped without requiring rehandling. The top piece 12 of the receptacle 10 may be formed in any desired manner, either integrally with the receptacle or separate therefrom. Preferably, for cheapness and rapidity in manufacture, it will be formed separately therefrom. In such construction, the edges of the top 12 are bent in under a flange 14 formed by turning outwardly the upper edges of the walls 11 of the receptacle, thus forming a tight joint and holding the cover firmly in place. The receptacle 10 is, as thus constructed, and as shown, both water-tight and steam-tight, except at the outlet, the top being so fixed in position that the receptacle forms a unitary body. By this construction it results that the water and the vapor therefrom is prevented from escaping from the receptacle 10, except at its outlet, the water being delivered above the coffee in the receptacle as hereinafter described, the water and steam is held in close contact with the coffee and forced or directed down therethrough to the outlet, this resulting in a very efficient steeping of the coffee. This receptacle 10, with its cover, may be supported in the receptacle in any suitable manner. As shown, a flange 15 is provided, which flange extends around the inner circumference of the jacket 3, being suitably secured to the walls thereof, the depending part 16 of which enters the inner side of the liquid holding receptacle 4, thus holding said receptacle in place within the jacket. The flange 15 also forms a seat for the receptacle, in which the receptacle 10, in the construction shown, is loosely supported.

The receptacle 10 is provided at its outlet with a strainer, for straining the coffee, this strainer also acting to hold the coffee within the receptacle. This strainer is preferably a removable strainer. As shown, there is provided for this purpose a piece of some textile material 18, as cheese-cloth or cotton which is placed across the outlet. This straining material is held in position by a clamping ring or band 17 which holds the straining material firmly in position across the mouth of the outlet. This clamping ring or band is held in position by suitable springs 19.

Means are provided by the present invention for supplying water to the containing receptacle. These means, in the best constructions, will be of such a character that the water will be delivered to the container above the coffee and be distributed evenly over its surface. In the particular construction shown, these means include a pipe 20, positioned in the upper part of the container and connected with a suitable source of water supply (not shown), through an elbow 21 carried by the container 10 (preferably by being formed integral with flange 14 thereof), and the lower end of which (see Fig. 4) connects by a ground joint with a fixed pipe 21' which passes through the wall of the jacket 3 from the water supply, the ground joint referred to being of such character that a tight fit between the pipes 21, 21' is secured without the use of packing. By means of this connection between pipes 20, 21 and 21' the container 10 and pipes 20, 21 may be readily and quickly lifted from and introduced into the urn. Pipe 20 is turned up at its inner end and provided with a nozzle 22, which nozzle is arranged to face the cover 12 of the container. With this construction, when water is supplied through the nozzle 22, it spreads out over the surface of the cover 12 and is spread or distributed equally over the top surface of the coffee or tea in the receptacle. Preferably this cover is an arched cover as shown in Fig. 1, this arch-shape facilitating the even distribution of the water.

The container 10 is provided with a handle 23 by which it may be bodily removed from the urn.

What I claim is:—

1. In an apparatus of the character described an outer jacket, a liquid holding receptacle within the jacket and spaced therefrom to form a water chamber, a flange extending around the inner circumference of the outer jacket having a depending portion which extends into the liquid holding receptacle and is arranged to bear against the inner side thereof to hold the same in position, a removable containing receptacle having the side walls bent outwardly at the top to form a flange and a top having its edges bent in under said flange, said container being seated on said first mentioned flange, a pipe for supplying water interiorly to the receptacle above the article contained therein, an outlet at the lower end of the receptacle, a removable strainer positioned over the outlet, and clamping means for holding the strainer in position, said receptacle being so constructed and arranged as to be water tight except at the outlet.

2. In an apparatus of the character described, a removable container comprising a receptacle having side walls and top secured together so as to form a unitary body for holding an article to be steeped, a pipe, permanently secured in the upper portion of the receptacle, upwardly turned to deliver against the top of the receptacle and be removable therewith for supplying water interiorly to the receptacle, an outlet at the lower end of the receptacle, a removable strainer for the receptacle, a clamping ring or band for securing the strainer in position having a flange, and springs having projections for engaging the flange for holding the ring or band in position on the receptacle, said receptacle being so constructed and arranged as to be water-tight except at the outlet.

In testimony whereof, I have hereunto set my hand, in the presence of two subscribing witnesses.

ARCHIBALD G. MILLER.

Witnesses:
G. M. BORST,
DANIEL P. BYRNES.